UNITED STATES PATENT OFFICE.

JOHN S. WILKINS, OF CINCINNATI, OHIO.

WELDING COMPOUND.

SPECIFICATION forming part of Letters Patent No. 301,032, dated June 24, 1884.

Application filed August 24, 1883. (No specimens.)

*To all whom it may concern:*

Be it known that I, JOHN S. WILKINS, of Cincinnati, in the county of Hamilton and State of Ohio, have invented a new and useful Improvement in Welding Compounds, which improvement is fully set forth in the following specification.

The object of the present invention is to provide a compound for use in welding iron or steel; and it consists of the following ingredients, combined and arranged in the following proportions, viz: borax, four pounds; white-marble dust, one pound; steel filings, one ounce; charcoal, two ounces; saltpeter, one-half ounce; prussiate potash, pulverized, one ounce. These ingredients are thoroughly pulverized and then mixed in any simple and thorough manner, so that all the elements become thoroughly compounded, and they do not require any special manipulation or arrangement of the component parts to increase their effectiveness.

Having described my invention, what I claim as new is—

The herein-described composition for welding iron or steel, consisting of borax, white-marble dust, steel filings, charcoal, saltpeter, and pulverized prussiate of potash, in the proportions specified.

In testimony that I claim the foregoing I have hereunto set my hand, this 14th day of August, 1883, in the presence of witnesses.

JOHN S. WILKINS.

Witnesses:
GIDEON C. WILSON,
C. D. ZERBE.